May 7, 1935.  J. SCHAUB  2,000,864
DISPENSING DEVICE
Original Filed Jan. 19, 1927   2 Sheets-Sheet 1
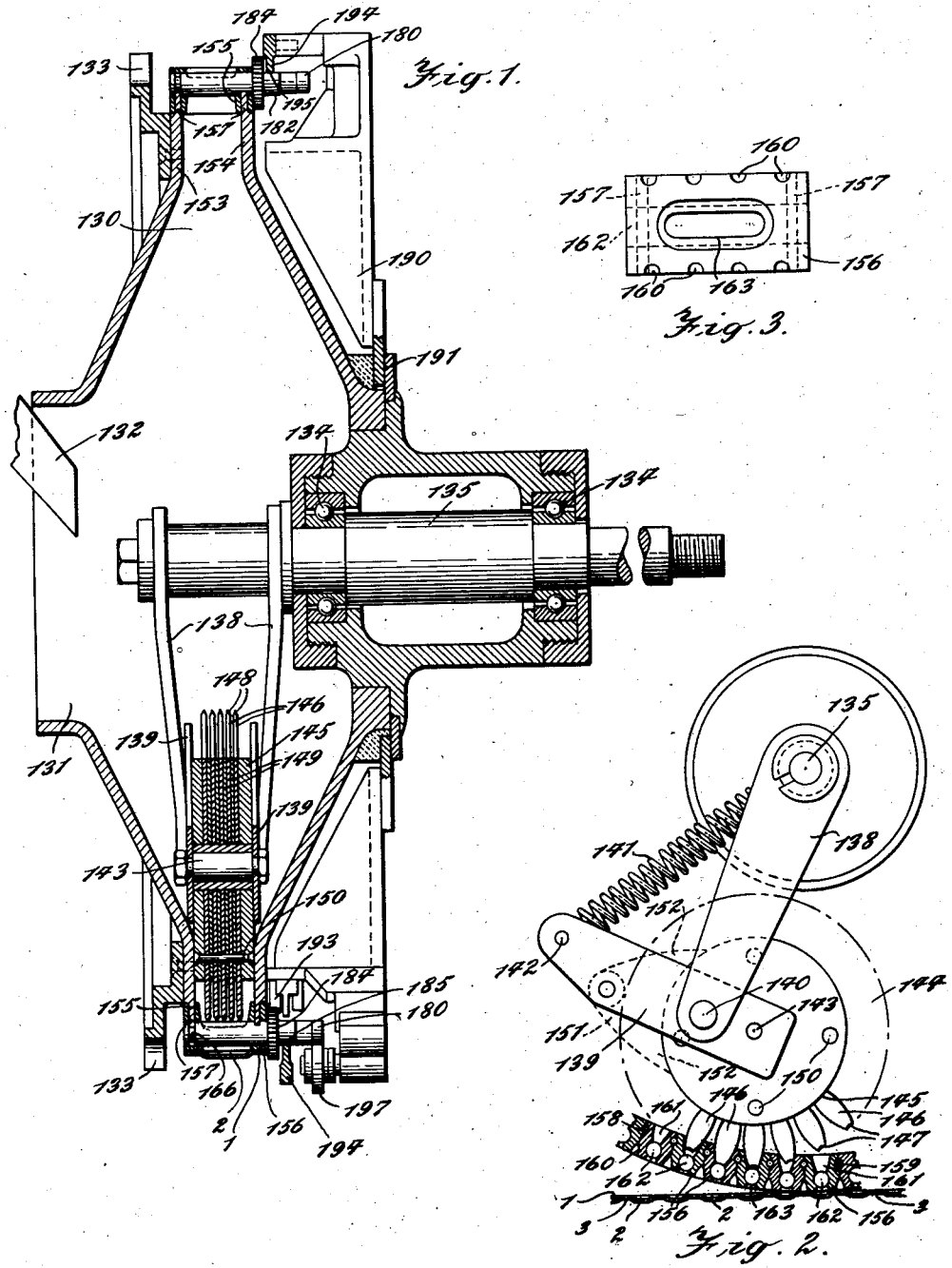
Jacob Schaub, INVENTOR
BY
Gifford, Scull & Burgess
ATTORNEYS May 7, 1935.                J. SCHAUB                 2,000,864
                        DISPENSING DEVICE
            Original Filed Jan. 19, 1927    2 Sheets-Sheet 2
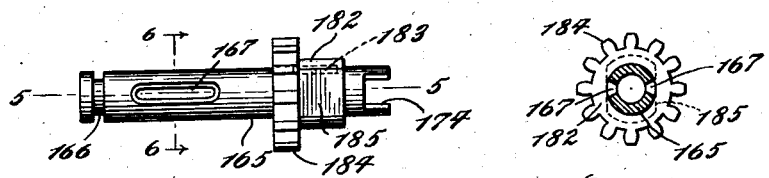
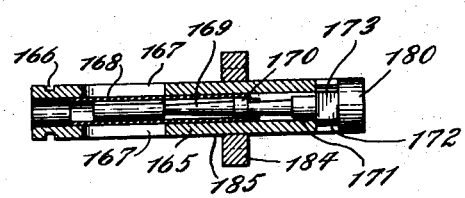
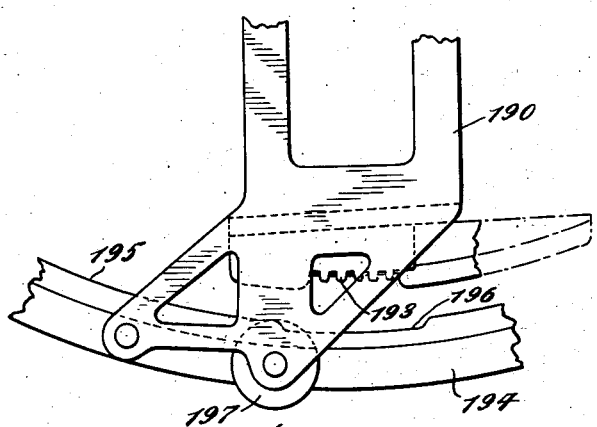
Jacob Schaub, INVENTOR
BY
ATTORNEYS Patented May 7, 1935

2,000,864

UNITED STATES PATENT OFFICE 2,000,864

DISPENSING DEVICE

Jacob Schaub, Westfield, N. J., assignor, by mesne assignments, to The Best Foods, Inc., New York, N. Y., a corporation of Delaware Original application January 19, 1927, Serial No. 161,972. Divided and this application March 12, 1932, Serial No. 598,323

21 Claims. (Cl. 221—106)

This invention relates to a device for dispensing batches of powdered or granular solid material. By this invention, materials of this character can be automatically fed in predetermined quantities into moving receptacles. The receptacles may be fed to the device in a strip, containing a series of receptacles, or such a strip may be passed in proximity to the dispensing device.

This is a division of my application, Serial No. 161,972, filed January 19, 1927.

The invention will be understood from the description in connection with the accompanying drawings in which Fig. 1 is a vertical section through an illustrative embodiment of the invention; Fig. 2 is a side view of mechanism that may be placed in the dispensing device; Fig. 3 is a plan view of a metal block on the periphery of the dispensing device; Fig. 4 is a plan view of a charge measuring element; Fig. 5 is a longitudinal section along the line 5—5 of Fig. 4; Fig. 6 is a section along the line 6—6 of Fig. 4 and Fig. 7 is a side view on an enlarged scale showing a detail of Fig. 1.

In the drawings reference character 1 (Figs. 1 and 2) indicates a strip of material, such as celluloid that can be softened by heat, for example, that is provided with a row of pockets or depressions 2 with the open faces of the pockets left upwardly to receive the charges of material from the dispensing device. The strip 1 is passed along longitudinally under the dispensing device so that the pockets 2 are filled with material from the dispensing device.

The dispensing device comprises a hollow feeding wheel 130. The feeding wheel 130 is of double-cone shape with the bases of the cones facing each other. The front cone is provided with an opening 131 into which a spout or chute 132 extends for feeding a supply of the material from any convenient source into the wheel 130. Teeth 133 are provided around the periphery of the wheel 130 by means of which the wheel 130 can be turned in synchronism with the travel of the strip 1 thereunder. A ball bearing 134 is provided on the stationary shaft 135 for the wheel 130, the shaft 135 being rigidly mounted at the desired place. Arms 138 (Figs. 1 and 2) rigid on the shaft 135 extend rigidly in the wheel 130 and carry at their ends cross arms 139 that are pivoted to the arms 138 at 140. A tension spring 141 connects a cross pin 142 at the ends of the arms 139 to the shaft 135. A cross pin 143 at the other ends of the arms 139 serves as a shaft or bearing for a packing wheel 144.

The packing wheel 144 is made up of a series of spaced discs 145, the peripheries of which are composed of toothed projections 146, the ends of which are slightly concave, as shown at 147. The edges of the discs 145 are beveled slightly, as shown at 148, to enable the same to pass more readily into the material that has to be fed to the pockets 2 of the strip 1. Spacing discs 149 of less diameter than the discs 145 are interposed between the discs 145. The discs 145 and 149 are clamped together to make a wheel by means of the rivets 150. A scraper 151 mounted on a stationary pin between the cross arms 139, has fingers 152 with concave ends extending between the discs 145 into contact with the periphery of the discs 149, so as to keep the material that might otherwise become packed between the discs 145 in loosened condition.

The bases of the cones forming the wheel 130 terminate in parallel flanges 153 and 154, and are recessed at their peripheries to form thin annular rims 155.

A circular row of wedge-shaped metal blocks 156 (Figs. 1, 2 and 3) is provided with grooves or slots 157 to fit the rims 155. Semicircular grooves 158 are provided along the contacting sides of the blocks 156 and pins 159 extend through the rims 155 and the grooves 158 to retain the blocks 156 in place around the periphery of the wheel 130. Semicircular holes 160 are provided along the edges of the blocks, these adjacent semicircular holes in adjacent blocks making holes into which pins on a driving mechanism (not shown) may extend, after passing through the holes 3 in the strip 1 to keep the strip 1 and wheel 130 moving in synchronism. Recesses 161 are provided on the inner sides of the blocks 156 into which the teeth 146 of the packing wheel 144 extend and by which this packing wheel is driven. The material that is fed into the wheel 130 through the spout 132 falls to the lower portion of this wheel and the discs 145 in revolving catch the material between the teeth 146 and pack it into the spaces 161, from which it is picked up in charges of predetermined size and fed to the pockets 2 by means of dispensing valves that are revolubly mounted in the holes 162 that communicate with the recessed portions 163 of the blocks 156. The holes 162 serve as bearings for the dispensing valves. The recesses 163 on the opposite side of the blocks 156 from the recesses 161 extend from the holes 162 to the outside surfaces of the blocks.

Each one of the dispensing valves comprises a hollow rod or pipe 165 (Figs. 4, 5 and 6) that is revolubly mounted in the hole 162 of a block 156 and serves as a charge measuring and dispensing device. The rods 165 are provided with annular grooves 166 near the ends thereof to fit on to the periphery of the rim 155 to keep the rods in place and prevent them from moving longitudinally while permitting them to be revolved. Each rod 165 is provided with a pair of charging pockets 167 that are 180° apart and flare outwardly to facilitate discharging of material therefrom. A tube 168 of resilient material, such as rubber, fills the hollow portion of each pipe or hollow rod 165 and a knock-out pin 169 extends into each tube 168. Each knock-out pin 169 is provided with a pivot or fulcrum ring 170 near one end of the tube 168. The tube 168 fits tightly around the ring 170. Each pin 169 is also provided with a ring 171 slightly less in diameter than the hole in the rod or pipe 165 and with a ring 172 slightly larger than this hole with its opposite sides flattened, as shown at 173. The flattened sides 173 of the pin 169 fit closely into the notched end 174 of the rod 165, the sides of this notch being parallel to each other. Each pin 169 terminates in a circular head or ring 180. Each hollow rod or pipe 165 has a sleeve 182 keyed thereon, (Fig. 4), as shown at 183, and these sleeves are provided with toothed flanges 184. The opposite sides of the sleeves 182 are flattened, as shown at 185.

A spider 190 (Figs. 1 and 7) has a frictional connection, as shown at 191, with the hub 192 of the feeding wheel 130. The spider 190 can be held stationary while the hub 192 is revolving or the spider 190 will revolve with the hub 192 by the frictional engagement therewith, unless it is held by a stop or the like to prevent it from revolving. The spider 190 carries a toothed segment 193 with half as many teeth as the number on the flange 184 of the sleeve 182. The segment 193 is located in the path of the planetary travel of the teeth of the flanges 184. The spider 190 also carries a ring 194 concentric with the shaft 135 and located so that the flat sides 185 of the sleeves 182 rub against the inner surface 195 of the ring 194 as they are carried around by the revolving wheel 130. A notch or cut-out portion 196 (Fig. 7) is provided along the inner surface of the ring 194 in proximity to the toothed segment 193.

As the wheel 130 is revolved to bring the metal blocks 156 into the lower portion of their path, the material to be fed into the pockets 2 of the strip 1 is pressed by the packing wheel 144 through the openings 161 in the metal blocks and into the upper charging pockets 167 of the charge measuring dispensing rods or pipes 165 that are revolubly mounted in the transverse holes or bearings 162 of the metal blocks 156. The sliding of the flat sides 185 of the sleeves 182, that are on the rods or pipes 165, along the inner edge 195 of the ring 194 keeps the pockets 167 turned toward the center of the wheel 130 so as to receive the material. When the sleeves 182 reach the cut-out portion 196, they are free to revolve. At this moment, the teeth 184 strike the stationary teeth 193 and since there are half as many teeth 193 as there are teeth 184, each sleeve 182 will be turned one-half of a revolution at the cut-out portion 196, thus bringing the pockets 167 thereof opposite the openings 163 in the metal blocks 156. At the same time, the strip 1 is carried along the outside or lower surfaces of the blocks 156 at the peripheral speed of these blocks with the pockets 2 of the strip 1 immediately below the openings 163 so as to receive the material therefrom. As soon as a sleeve 182 is turned one-half a revolution by the toothed segment 193, the other flat surface 185 thereof is caused to slide along the inside surface 195 of the ring 194 so that the other pocket 167 of the corresponding pipe 165 is brought into position to be charged with material the next time the pipe 165 is brought around to the charging position, thus causing alternate pockets 167 in the pipe 165 to be charged and discharged at successive revolutions of the wheel 130.

The material, especially if in powdered form, would sometimes become clogged in the pockets 167 and not drop into the pockets 2 when the pipe 165 is turned, and for this reason, the knock-out pin 169 is used. The spider 190 carries a roller 197 located in the path of the heads 180 of the knock-out pins 169, so that the heads 180 will strike the roller 197 immediately after the pipes 165 have been revolved half a revolution, and while the pockets 2 of the strip 1 are immediately below the openings 163 of the metal blocks 156. When the head 180 strikes the roller 197, the flat sides 173 of the ring portion 172 of the knock-out pin 169 is moved upwardly along the notched end 174 of the pipe 165 and since this pin is fulcrumed at 170, its opposite end extending into the resilient tube 168 between the pockets 167 will give a blow to the material in the lower pocket 167 through the resilient material, thus loosening the material if it should happen to be caught and causing it to drop into the corresponding pocket 2. When it is desired to permit the wheel 130 to revolve without feeding charges of material into the pockets 2, the stationary stop or obstruction that prevents the spider 190 from revolving is removed, so that the pipes 165 are not reversed anywhere in their annular path of travel and therefore no material is fed from the wheel 130 under these conditions.

I claim:

1. A dispensing device comprising a hollow member, charge dispensing members closing the periphery of said member, and means to charge said dispensing members and discharge them at substantially a single predetermined point in their movement.

2. A dispensing device comprising a hollow member, charge dispensing members mounted on the periphery of said member and revolved only when in substantially the lowermost position, and means to charge said dispensing members from the inside of said member and discharge them from the outside thereof.

3. A dispensing device comprising a hollow member, charge dispensing members mounted on the periphery of said member and revolved only when in substantially the lowermost position, means inside of said member to charge said charge dispensing members, and means outside of said member to cause said charge dispensing members to become discharged.

4. A dispensing device comprising a hollow revoluble member for receiving material to be dispensed, means for mounting said member to revolve in a vertical plane, said member having charge dispensing means around its periphery revoluble in relation to said hollow member at substantially the point of discharge.

5. A dispensing device comprising a hollow revoluble member for receiving material to be dispensed, means for mounting said member to revolve in a vertical plane, said member having charge dispensing means around its periphery revoluble in relation to said hollow means at substantially the point of discharge, said dispensing means comprising revoluble charge holding elements.

6. A dispensing device comprising a hollow revoluble member for receiving material to be dispensed, said member having charge dispensing means around its periphery, said means comprising revoluble charge holding elements having pockets therein, and means to revolve said charge holding elements in their lowermost position in the periphery of said hollow member.

7. A dispensing device comprising a hollow revoluble member for receiving material to be dispensed, said member having charge dispensing means around its periphery, said means comprising revoluble charge holding elements having pockets therein, means to revolve said charge holding elements in their lowermost position in the periphery of said hollow member, and means to cause material to enter said pockets.

8. A dispensing device comprising a hollow revoluble member for receiving material to be dispensed, said member having charge dispensing means around its periphery, said means comprising revoluble charge holding elements having pockets therein, means to revolve said charge holding elements in their lowermost position in the periphery of said hollow member, means to cause material to enter said pockets, and means to discharge said pockets at predetermined points.

9. A dispensing device comprising a hollow revoluble member for receiving material to be dispensed, said member having charge dispensing means around its periphery, said means comprising revoluble charge holding elements having pockets therein, means to revolve said charge holding elements in their lowermost position in the periphery of said hollow member, means to cause material to enter said pockets, and means to discharge said pockets at predetermined points, said last-named means comprising a stationary element.

10. A dispensing device comprising a hollow revoluble member having charge dispensing means around its periphery, said means comprising revoluble charge holding elements having pockets therein, means to revolve said charge holding elements in their lowermost position in the periphery of said hollow member, means to cause material to enter said pockets, and means to discharge said pockets at predetermined points, said last-named means comprising a striker for the bottom of said pockets.

11. In a dispensing device, a row of charge carrying elements movable in a curvilinear path and revoluble around their own axes, said axes being at right angles to the plane of said path, and means to charge and discharge them at substantially a single predetermined point.

12. In a dispensing device, a row of revoluble charge carrying elements movable in a curvilinear path in a vertical plane, and means to impart a revolving motion to each one at a predetermined point around an axis perpendicular to the plane of said curvilinear path and knock out the material that is being dispensed.

13. In a dispensing device, a row of revoluble charge carrying elements movable in a curvilinear path in a vertical plane and revoluble around their own axes, said axes being perpendicular to the plane of said curvilinear path, and means to discharge them at a predetermined point, said elements being of cylindrical shape and having pockets in their peripheries.

14. In a dispensing device, a row of charge carrying elements movable in a curvilinear path in a vertical plane and revoluble about axes at right angles to the plane of said path, and means to discharge them at a predetermined point, said means comprising a toothed member.

15. In a dispensing device, a revoluble container for material to be dispensed, means for mounting said container to revolve in a vertical plane, and means comprising valves whereby said material is dispensed in predetermined batches from the lower portion of said container.

16. In a dispensing device, a revoluble container for material to be dispensed, means for mounting said container to revolve in a vertical plane and means whereby said material is dispensed in predetermined batches from the lower portion of said container, said means comprising a member located in said container and operable by said container to aid in dispensing the material.

17. In a dispensing device, a revoluble container for material to be dispensed, means for mounting said container to revolve in a vertical plane and means whereby said material is dispensed in predetermined batches from the lower portion of said container, said means comprising revoluble members along the periphery of said container, said revoluble members being revoluble around axes parallel to the axis of said revoluble container.

18. In a dispensing device, a revoluble container having a circular periphery and means comprising valves for dispensing material in predetermined batches at said periphery from the inside of said container only at substantially the lowermost point of the said container.

19. In a dispensing device, a revoluble container having a circular periphery and means for dispensing material in predetermined batches at said periphery from the inside of said container only at substantially the lowermost point of the said container, said means comprising charge receiving members revoluble on their own axes, the axes of said charge receiving members being parallel to the axis of said revoluble container.

20. In a dispensing device, a revoluble container having a circular periphery and means for dispensing material in predetermined batches at said periphery from the inside of said container, and means in said container operated by movement of said container to fill said dispensing means with material.

21. A dispensing device comprising a circular, hollow member, said member having walls converging toward each other in a radial direction at a steeper angle than the angle of repose of the material to be dispensed, means for mounting said member to revolve in a vertical plane, and means to discharge material from the periphery of said member.

JACOB SCHAUB.